(No Model.)

B. F. MOONEY.
ROPE OR CORD FASTENING.

No. 475,245. Patented May 17, 1892.

Witnesses
W. B. Hour
A. M. Johnson

Inventor
Benjamin F. Mooney
By his Attorney

UNITED STATES PATENT OFFICE.

BENJAMIN F. MOONEY, OF OLEAN, NEW YORK, ASSIGNOR OF ONE-HALF TO I. F. PRATT AND EDWARD TROY, OF SAME PLACE.

ROPE OR CORD FASTENING.

SPECIFICATION forming part of Letters Patent No. 475,245, dated May 17, 1892.

Application filed September 17, 1891. Serial No. 405,971. (No model.)

*To all whom it may concern:*

Be it known that I, BENJAMIN F. MOONEY, a citizen of the United States, residing at Olean, in the county of Cattaraugus and State of New York, have invented certain new and useful Improvements in Rope and Cord Fastenings; and I do hereby declare the following to be a full, clear, and exact description of the invention, such as will enable others skilled in the art to which it appertains to make and use the same.

This invention is adapted for general use in connection with cords or ropes in various places—such, for instance, as a fastening for the cord of a window-shade, or the adjusting-ropes of awnings, sailing craft, hammocks, tents, and especially clothes-lines, the object of the invention being to provide an inexpensive and ready means of securing cords and ropes when subjected to a strain without recourse to any of the various forms of knot commonly used for the purpose.

The invention will be fully set forth in the following specification and claims and clearly illustrated in the accompanying drawings, forming a part thereof, in which—

Figure 1:
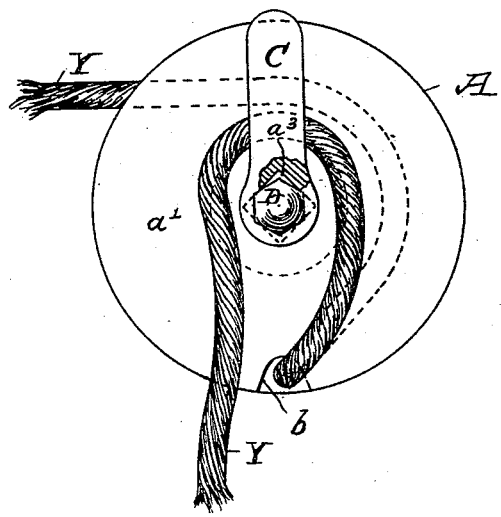
Figure 2:
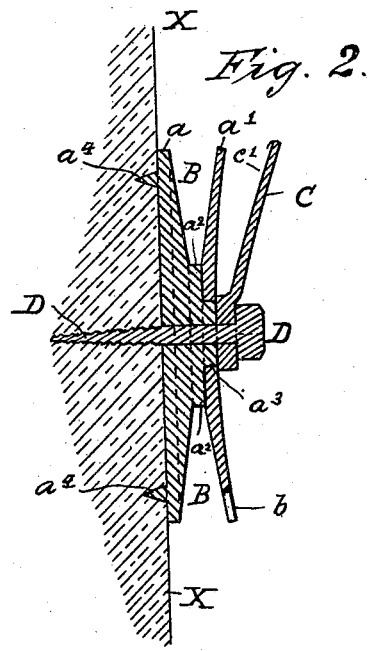
Figure 3:
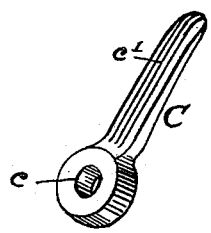

Figure 1 represents one of my improved fastenings in broken elevation, showing a portion of a rope in a position as when secured therewith, Fig. 2 being a vertical sectional view with the piece of rope removed. Fig. 3 is a perspective view of the outside hook or retaining-arm, showing corrugations upon its back side as an additional preventive against accidental displacement or slipping of rope.

A is a circular metallic block, having an annular groove B formed in its edge and tapering from the exterior inward, so that the smallest diameter of said groove is the narrowest portion of same. As it is desirable that the groove B shall be somewhat smooth I prefer to construct the block A in two parts $a$ $a'$, as seen in Fig. 2, the disk $a$ being provided with a boss $a^3$, forming the seat for the disk $a'$ and the interior diameter of the groove B. A small square portion $a^3$ of the boss $a^2$ extends into a similar-shaped socket in the disk $a'$ in order to prevent the latter from turning, and a hook or arm C is confined or secured at one end to the disk $a'$ by the screw D, which passes through said hook, the disks $a'$ and $a$, and is threaded into the support X, upon which the fastening-block A is mounted. Prongs $a^4$ project from the back side of the disk $a$, which enter the support X and prevent the turning of said disk when strained by the rope Y. The arm C is perforated at $c$ for the reception of the retaining-screw D, and its back side is corrugated or serrated longitudinally, as at $c'$, Figs. 2 and 3, to increase the friction in contact with the rope Y, and in line with the said arm C a slot $b$ is formed in the disk $a'$, the fastening of a rope being effected by passing said rope in the groove B between the two disks $a$ $a'$, bringing it out through said slot $b$, and thence over the hook or arm C.

There are many advantages which my improved fastening possesses over those fastenings in common use—*i. e.*, a taut rope may be secured without slacking in the least; even though a rope be strained to its utmost the fastening can be let loose as easily as though the rope were not strained; there are no knots to tie or untie; the fastening is simple; it is reliable to the extent of the strain a given rope will bear, as a rope will break before the fastening will yield or become loose, for the more the strain the more tightly the rope wedges itself within the groove B; it requires but slight exertion to make a rope fast, and is very quickly adjusted.

Having described my improvement, what I claim is—

1. A rope or cord fastening consisting of a circular block provided with an annular tapering groove, a slot in the outer edge of said block, an arm or hook, a retaining-screw for securing one end of said arm or hook to said block and the said block to its support, and prongs upon the back of said block penetrating its support.

2. As a rope or cord fastening, a holding-block formed of two disks, the space between their outer edges forming an annular groove to receive a rope, an arm or hook having serrations on its inner side operating in conjunction with the outer of said disks having a slot in its edge, and means for securing said device to a suitable support.

In testimony whereof I affix my signature in presence of two witnesses.

BENJAMIN F. MOONEY.

Witnesses:
C. P. MOULTON,
WILLIAM V. SMITH.